Feb. 25, 1969     A. L. RENKEY     3,429,975
INDUCTION FURNACE CONSTRUCTION
Filed Dec. 14, 1966
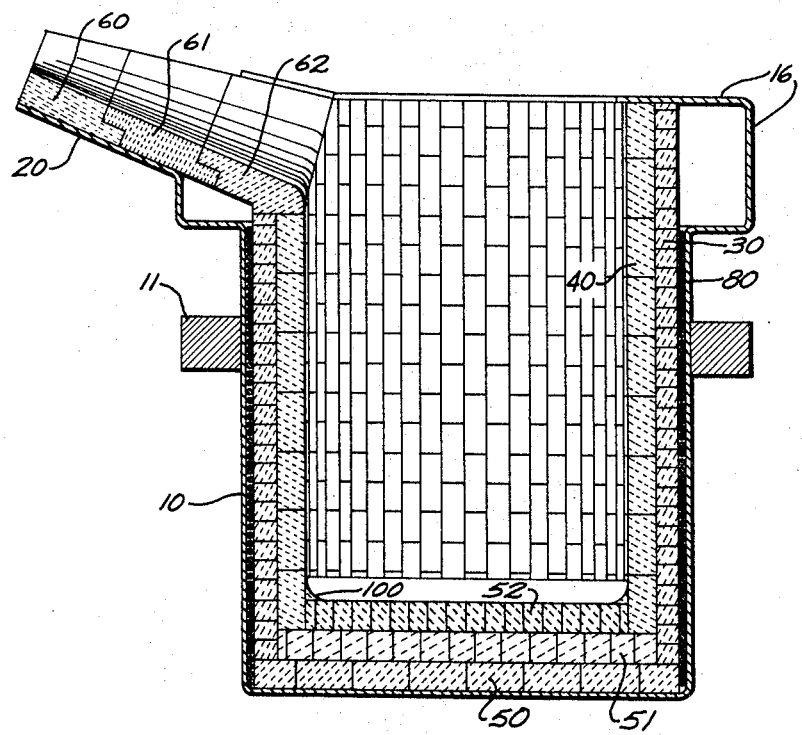
INVENTOR.
ALBERT L. RENKEY
BY William C. [signature]
ATTORNEY

3,429,975
INDUCTION FURNACE CONSTRUCTION

Albert L. Renkey, Pittsburgh, Pa., assignor to Dresser Industries, Inc., Dallas, Tex., a corporation of Delaware
Filed Dec. 14, 1966, Ser. No. 601,714
U.S. Cl. 13—35
Int. Cl. H05b 5/14
5 Claims

ABSTRACT OF THE DISCLOSURE

The present disclosure relates to an improved induction furnace construction in which the refractory working lining is composed of a magnesium aluminate spinel bonded periclase brick and the backup lining is composed of high alumina brick.

---

Induction furnaces in the United States are growing rapidly both in number and capacity, particularly in the ferrous metal working industry. This growth has come after a dormant period of almost three generations and has resulted from:

(1) a great demand for clean, closely controlled products as steel enters its second century, and
(2) marked improvements in the equipment and materials required for economic induction furnace operation.

One of the rather startling developments in induction furnace practice has been the trend towards considerably larger vessels; for example, furnaces of over two hundred tons capacity. Of course, this recent trend towards considerably larger vessels and more automated and superior control arrangements has had a serious effect on refractories previously used to line such furnaces. One result has been use of higher purity refractory materials; but even this has not been the complete answer.

Rammed linings previously have been considered the most desirable form of construction for an induction furnace. A rammed lining has been considered desirable because it was monolithic in character, i.e., there were no cracks or joints through which molten metal could penetrate to coils, cooling conduits, and the like. The propensity of many ramming mixes to shrink has also been considered desirable because this provided a more dense, impervious, lining structure.

However, in very large vessels, monolithic linings have just not been as satisfactory as desired. Not only have the labor and material requirements for the formation of monolithic linings been extremely distasteful, but for some unknown reason, there appears to be greater propensity in these larger vessels for the rammed monolith to crack and in other ways rapidly deteriorate.

Refractory linings, in any type of furnace should have the ability to chemically and physically resist deterioration in service. Chemical resistance is accomplished by judicious selection of refractory ingredients. For example, basic refractory, such as dead burned magnesite or magnesia, is used to fabricate the refractory lining when a chemically basic service environment is expected. Non-basic or acid type refractory is selected when an acid environment is expected; for example, a high alumina refractory. "High alumina" is understood by those skilled in the art to infer $Al_2O_3$ containing materials containing at least about 50%, by weight, of $Al_2O_3$.

Physical properties or characteristics desirable in the refractory lining to provide optimum service include ability to resist penetration by molten metal and slags, ability to resist attack and penetration by effluent gases, ability to resist rapid and wide cyclic variation in temperature without spalling or cracking, etc., volume stability, i.e., shrinkage or expansion due to change in the mineralogical character of the refractory when exposed to surface temperatures, is also an important consideration.

Accordingly, it is an object of the present invention to provide an improved induction furnace construction.

Another object of the invention is to provide an increased lining life in an induction furnace.

Other objects of the invention will, in part, become apparent hereinafter.

In order to more fully understand the nature and objects of the invention, reference should be had to the following detailed descriptions and drawings, the single figure of which is a schematic elevation view in cross-section, of a typical coreless type induction furnace.

The coreless induction furnace consists of a primary (the furnace coil), and a secondary (the molten metal). When a high frequency alternating current is supplied to the primary a current is induced in the secondary. The induced current rapidly heats the metal bath and melts any scrap or other solid metal in the charge. The core type induction furnace contains a primary coil surrounding a laminated core. The secondary consists of molten metal in a channel surrounding a primary coil. While the invention will be described with regard to a coreless type furnace, it should be appreciated that it also extends to core type furnaces.

In accordance with the present invention there is provided an induction furnace consisting essentially of an outer metal shell in the form of an open topped tubular vessel, a refractory tank lining adjacent the shell and a refractory working lining adjacent the tank lining. The working lining is composed of ceramically bonded basic refractory shapes made from a mix consisting essentially of at least 80% of dead burned magnesite and the balance a high purity aluminous material. Preferably, the aluminous material analyzes at least 99% $Al_2O_3$, on an oxide basis. Also, preferably, the magnesite constitutes between about 90 and 93%, by weight, of the mix. The burned brick are characterized petrographically as consisting of a matrix of periclase grain bonded together by magnesium aluminate spinel. Preferably, the magnesium aluminate spinel constitutes from about 10 to 25%, by weight, of the brick. The back-up or tank lining is fabricated from ceramically bonded high alumina refractory brick.

The refractory brick in the working lining of the induction furnace is prepared by mixing dead burned magnesite, size graded, —6 mesh through fines with high purity aluminous material size graded to pass a 35 mesh screen. Preferably, the aluminous material is all —65 mesh in which about 50% passes a 325 mesh screen. The typical chemical analysis of the dead burned magnesite and aluminous materials useful in the present invention for fabricating the working lining are shown in Tables I and II below.

TABLE I

| Magnesite materials | Percent | | | |
| --- | --- | --- | --- | --- |
|  | 1 | 2 | 3 | 4 |
| $SiO_2$ | 2.8 | 1.6 | 3.5 | 0.7 |
| $Al_2O_3$ | 0.3 | 0.3 | 0.4 | 0.3 |
| $Fe_2O_3$ | 0.6 | 0.6 | 0.3 | 0.3 |
| CaO | 1.5 | 1.4 | 0.9 | 0.8 |
| MgO | 94.8 | 96.1 | 94.9 | 98.0 |

TABLE II

| Aluminous materials | A | B | C |
| --- | --- | --- | --- |
| $SiO_2$ | 0.03 | 0.02 | 0.02 |
| $Al_2O_3$ | 99.5 | 99.09 | 99.0 |
| $TiO_2$ | 0.03 |  | Trace |
| $Fe_2O_3$ | 0.2 | 0.04 | 0.04 |
| CaO | 0.08 |  |  |
| MgO | 0.03 |  |  |
| Alks | Trace | 0.55 | 0.5 |
| Loss |  | 0.40 | 0.75 |

The size graded mixture is pressed into shapes at a pressure of about 4000 to 8000 p.s.i. and the shapes are burned in excess of 2900° F.

Merely by way of example, shapes were fabricated consisting of about 92% dead burned magnesite of the type 4 in Table I and about 8% aluminous material of the type A shown in Table II. The mix had the following typical screen analysis:

|  | Percent |
| --- | --- |
| Held on 10 mesh | 20–30 |
| Pass 10 on 28 mesh | 20–25 |
| Pass 28 on 65 mesh | 10–20 |
| Pass −65 mesh | 30–40 |

The mix was pressed into shapes at about 6000 p.s.i. and was burned at a temperature of 3123° F. The shapes were tested to determine density strength and spalling resistance. The results of these tests are shown in Table III below:

TABLE III

| | |
| --- | --- |
| Density, p.c.f. (av. 12) | 181. |
| Modulus of rupture, p.s.i. (av. 5) | 1050. |
| Apparent porosity (av. 4) | 16.5%. |
| Apparent sp. gr. (av. 4) | 3.49. |
| Reheat 3140° F. (1725° C.) (av. 3): | |
|    Linear change, across top | −0.1%. |
|    Linear change, vertically | −0.2%. |
|    Volume change | −0.3%. |
|    Appearance after reheat | No sticking or surface wetting. |
| Loss in panel spalling test: | |
|    No preheat (av. 6) 0.0% | 0.0%. |
| Load test, 25 p.s.i. (av. 2): | |
|    Temperature of failure | No failure at 3090° F. |

The advantageous properties, high density, low porosity, reheat stability, superior resistance to spalling, and high strength at elevated temperatures are directly attributable to the structure and composition of the brick.

As is set forth above, the back-up or tank lining consists of high alumina refractory shapes. A preferred high alumina refractory is disclosed and claimed in United States Patent No. 3,067,050 to Miller, assigned to the present assignee. The shapes of this patent are prepared from a mix consisting essentially of, by weight, at least about 1% to not over 10% of substantially pure volatilized silica and the remainder of a coarse ground alumina refractory material having less than about 1.3%, by weight, of iron oxide. The alumina refractory is selected from the group consisting of alumina, aluminum ores, and mixtures thereof containing at least about 50% of $Al_2O_3$, by analysis, whereby the mix contains at least about 50% of $Al_2O_3$ by analysis, supplied by the refractory material. The silica is substantially all in the form of a fine crystalline mullite binding between the particles of refractory material and in which the mullite appears in the form of a mass of micron size crystals having very small and highly dispersed voids whereby a coarse textured yet dense and highly impermeable body is obtained. The above patent is incorporated herein by reference.

The combination of a burned magnesium aluminate bonded periclase brick working lining and a burned high alumina brick tank lining preferably consisting of alumina particles bound by fine crystalline mullite, extends the service life of linings in induction furnaces about 30% as compared to monolithic linings, balances the service life of the vessels and affords the best economy.

In the foregoing, all chemical analysis are on the basis of an oxide analysis. All screen sizing is according to the Standard Tyler mesh series.

Referring to the drawing, there is shown an induction furnace having a metal shell 10 which is carried in a circumferential ring 11. Adjacent the top of the shell 10 and integrally attached thereto is an enlarged circumferential fitting 16 which includes a flange portion normally disposed contiguous to upper surfaces of the brick forming the interior lining. As is conventional, a trough 20 allows for pouring of a stream of molten metal from the vessel.

The lining itself consists of two walls or layers of refractory brick. The outer or backup layer 30 is comprised of a plurality of substantially identical high alumina shapes laid in concentric rings. Of course, if desired, conventional refractory key or arch shapes can be used to form the rings.

The inner or working lining 40 is comprised of a plurality of substantially identical magnesite-alumina brick. The brick may be laid in concentric rings or on edge and staggered to assure elimination of substantial communication between joints in the tank and working lining.

The bottom is constructed of three courses 50, 51 and 52. Composition may correspond to the backup and working lining. The trough 20 is shown lined with three interlocking special shapes 60, 61 and 62 of generally upwardly opening arcuate configuration. These shapes should be made of a refractory shape or ramming mix compatible with that used for the working lining.

To complete the description, there is shown a primary coil 80 disposed between the outer shell 10 and the backup lining 30. According to good practices the primary coil should be coated with a mortar of a refractory compatible with the refractory used in the backup lining.

Having thus described the invention in detail and with sufficient particularity as to enable those skilled in the art to practice it, what is desired to have protected by Letters Patent is set forth in the following claims.

I claim:

1. An induction furnace consisting of an outer metal shell, a refractory tank lining on the interior walls of the shell and a working lining along the sidewalls adjacent the tank lining, said working lining being fabricated from ceramically bonded basic refractory shapes made from a mix consisting essentially of at least 80% dead burned magnesite and the balance high purity aluminous material, said burned shape being characterized petrographically as having a matrix of periclase bonded by magnesium aluminate spinels, the tank lining being fabricated from ceramically bonded, high alumina refractory shapes.

2. The furnace of claim 1 in which the high alumina shapes are prepared from a batch containing at least 1% to not over 10% of substantially pure volatilized silica, and the remainder a coarse ground alumina refractory material, having less than about 1.3%, by weight, of iron oxide, and selected from the group consisting of alumina, aluminum ores and mixtures thereof containing at least about 50% of $Al_2O_3$, by analysis, whereby the mix contains at least about 50% of $Al_2O_3$ by analysis supplied by said frefractory material, said silica being substantially all in the form of a fine crystalline mullite binding between the particles of the refractory material and in which said mullite appears in the form of a mass of sub-micron size crystals having very small and highly dispersed voids whereby a coarse textured yet dense and highly impermeable body is obtained.

3. The induction furnace of claim 1 in which the shapes making up the working lining contain from about 10 to 25%, by weight, of magnesium aluminate spinel in the matrix.

4. The induction furnace of claim 1 in which the aluminous material in the mix for the shapes making up the working lining analyzes at least 99% $Al_2O_3$.

5. The induction furnace of claim 1 in which the mix for the brick making up the working lining contains from about 90 to 93% by weight, dead burned magnesite.

References Cited

UNITED STATES PATENTS

| | | | |
|---|---|---|---|
| 3,067,050 | 12/1962 | Miller | 106—65 |
| 3,179,526 | 4/1965 | Dolph | 106—57 |
| 3,141,790 | 7/1964 | Davies et al. | 117—123 |
| 3,180,744 | 4/1965 | Davies et al. | 106—59 |
| 3,347,972 | 10/1967 | Renkey | 13—35 |
| 3,355,537 | 11/1967 | Troell et al. | 13—35 |

RICHARD M. WOOD, *Primary Examiner.*

L. H. BENDER, *Assistant Examiner.*

U.S. Cl. X.R.

13—30